July 6, 1943.  W. P. LEAR  2,323,337
RADIO NAVIGATION SYSTEM
Filed Jan. 11, 1940  4 Sheets-Sheet 1
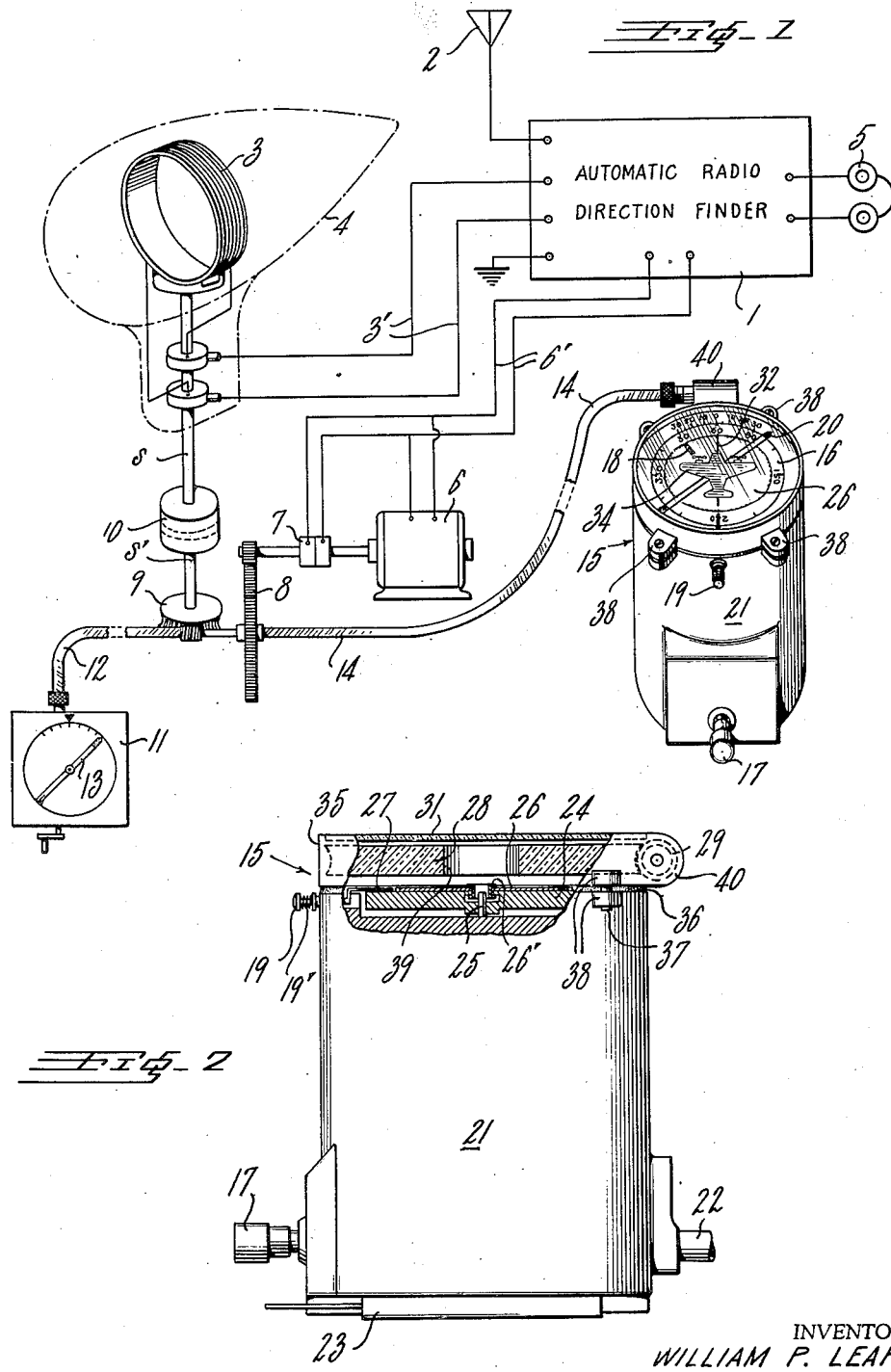
INVENTOR.
WILLIAM P. LEAR
BY Richard A. Morse
ATTORNEY.

July 6, 1943.  W. P. LEAR  2,323,337
RADIO NAVIGATION SYSTEM
Filed Jan. 11, 1940  4 Sheets-Sheet 2
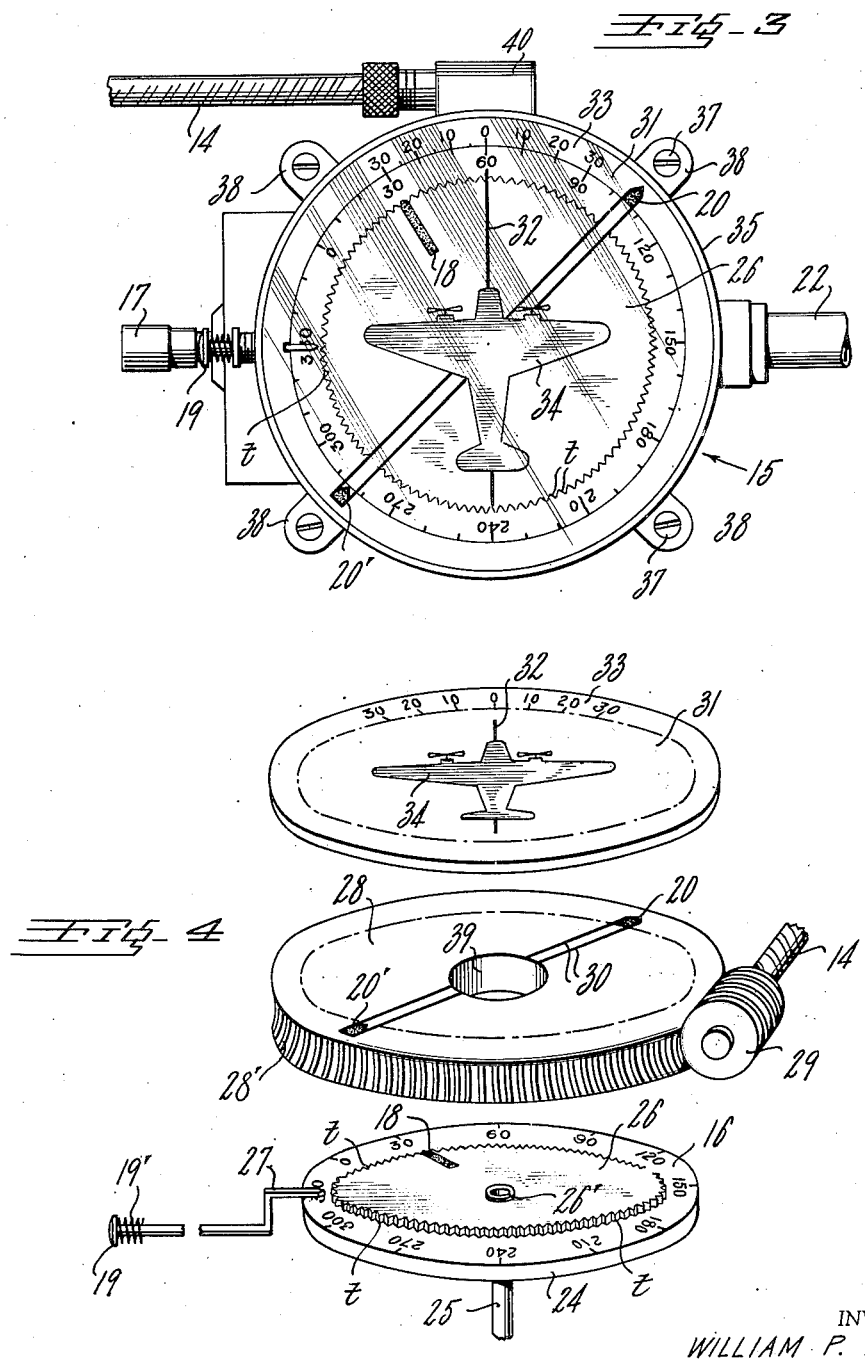
INVENTOR.
WILLIAM P. LEAR
BY Richard A. Morse
ATTORNEY.

July 6, 1943.    W. P. LEAR    2,323,337
RADIO NAVIGATION SYSTEM
Filed Jan. 11, 1940    4 Sheets-Sheet 3
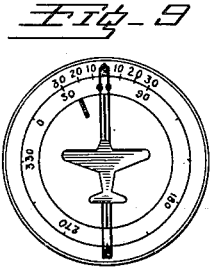
Fig. 9
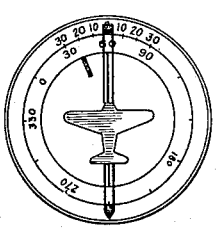
Fig. 10
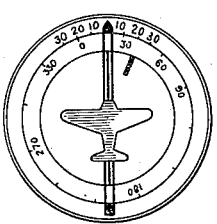
Fig. 11
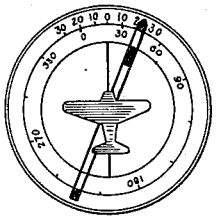
Fig. 12
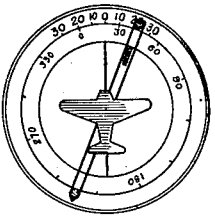
Fig. 13
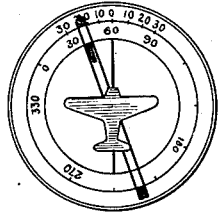
Fig. 14
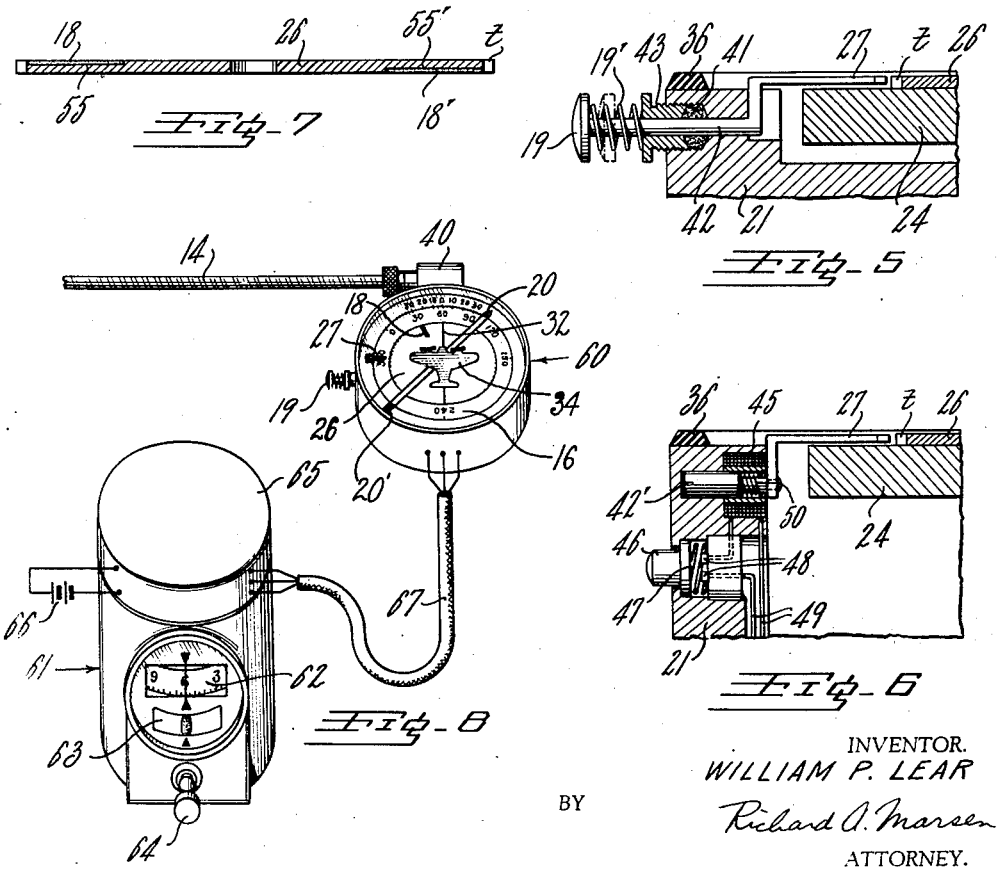
INVENTOR.
WILLIAM P. LEAR
BY Richard A. Marsen
ATTORNEY.

July 6, 1943.  W. P. LEAR  2,323,337
RADIO NAVIGATION SYSTEM
Filed Jan. 11, 1940  4 Sheets-Sheet 4
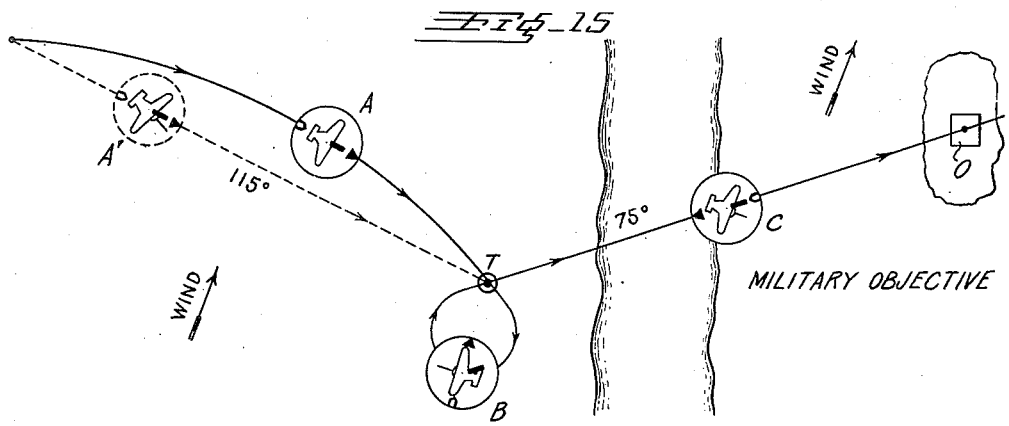
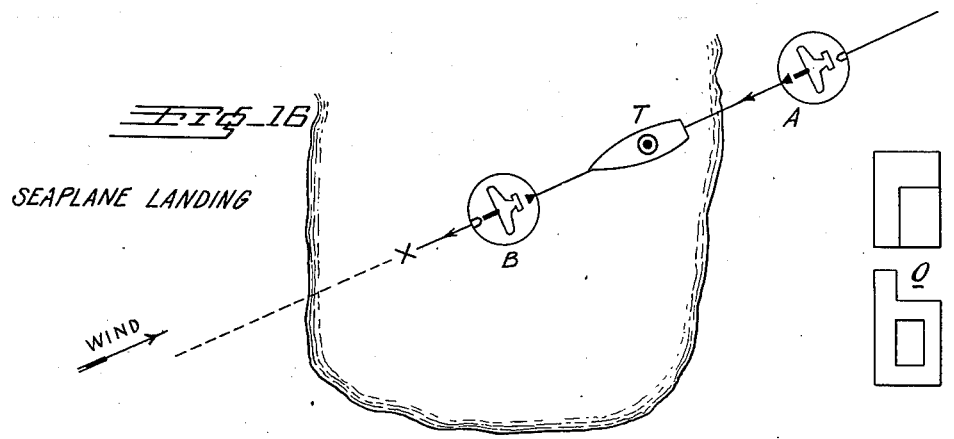
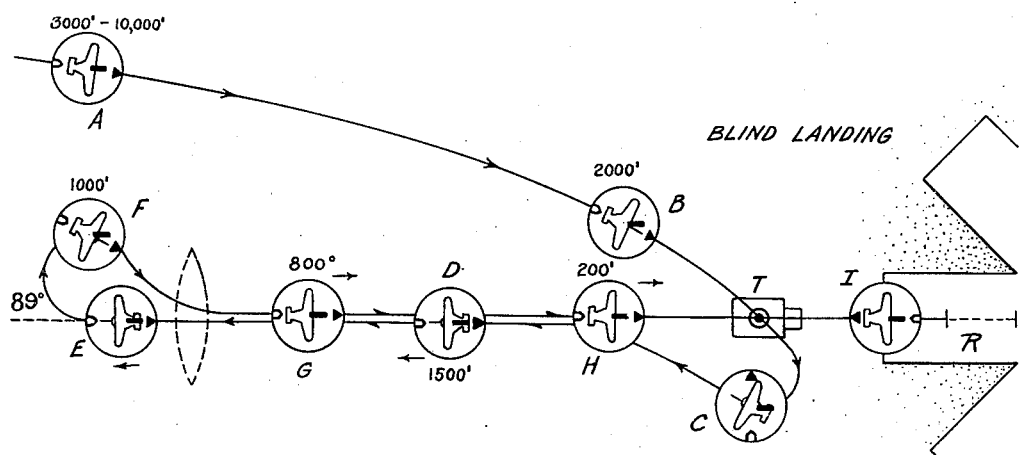
INVENTOR.
WILLIAM P. LEAR
BY
Richard A. Marsen
ATTORNEY.

Patented July 6, 1943

2,323,337

UNITED STATES PATENT OFFICE 2,323,337

RADIO NAVIGATION SYSTEM

William P. Lear, Dayton, Ohio, assignor, by mesne assignments, to Lear Avia, Inc., Piqua, Ohio, a corporation of Illinois Application January 11, 1940, Serial No. 313,433

13 Claims. (Cl. 250—11)

This invention relates to navigational indication systems, and more particularly relates to a novel composite indicator directly solving and simplifying heretofore complex problems in aircraft navigation.

The trend of modern aircraft navigation is towards greater safety and reliability of operations and schedules as well as towards greater flexibility of maneuvering. Efforts have been directed to provide indications to effectively guide the pilot in his navigation despite difficult terrain or adverse weather conditions such as wind, rain, fog, and the like. The art, however, has developed complex systems for these purposes, requiring correlation of a number of separate indications, interpretations, and numerical calculations on the part of the already burdened pilot, as well as requiring a multitude of special ground radio and associated equipment.

In accordance with the present invention, aircraft navigation is reduced to simple terms, continuously affording the pilot automatic pictorial indications of his orientations and maneuvers, and reducing even the most advanced problems to simple, readily interpreted indications. The pilot is thus relieved of mental strain and uncertainty as to position or orientation, and is directly apprised of the best and most direct manner to navigate his aircraft under all conditions of flight. The only ground facility required in conjunction with the system of the invention is a single radio transmitter, of any type, in the vicinity or in the path of the destination.

With the system of the present invention, straight-track navigation along any desired radial heading is readily effected towards or away from a radio station, despite cross-winds or non-visibility. The angle of drift of the aircraft due to cross-winds is directly indicated, and automatically corrected for in flight. The composite instrument may be used as a regular 360° automatic radio direction finder and as a gyro-compass. With the system the pilot is enabled to confidently execute a direct low approach and blind descent onto a runway, regardless of local weather conditions. For blind landing, the transmitter is located at the head of the selected runway.

The composite navigational indicator comprises a course index held angularly fixed in space parallel to the destination of the desired course, and an index giving an accurate bearing on a radio station in the path of the desired course. A further reference index is provided corresponding to the zero heading or "lubber line' of the aircraft. The "desired course" index is continuously oriented with a directional gyroscope or gyro-compass, or with a magnetic compass. The "radio course" index is controlled by a 360° azimuthally compensated automatic radio direction finder system tuned to the charted ground radio station. The composite navigational indicator accordingly performs the functions of a radio direction finder and a directional compass, as well as the important additional functions referred to above and to be described in detail hereinafter.

An important feature of the present invention resides in the provision of means permitting the pilot to adjust the "desired course" index of the instrument without opening it up. This feature is direct, saves time and effort on the part of the pilot, and is particularly important where an air-driven gyro-compass is incorporated with the indicator. The "radio course" index is inscribed on a transparent gear floatingly arranged in a manner preventing its freezing in position due to the presence of negative air pressures within the indicator instrument. The floating gear is directly driven by the automatic radio direction finder system, being coupled to the azimuthal indicator thereof. A further important feature of the present invention resides in the direct novel pictorial arrangement of the composite indications, resulting in their interpretation by the pilot practically by intuition.

It is accordingly an object of the present invention to provide a novel composite navigational indication system.

A further object of the present invention is to provide a novel navigational indicator directly resolving navigational problems into simple terms.

Still a further object of the present invention is to provide a novel composite pictorial arrangement of navigational indications.

A further object of the present invention is to provide a composite pictorial navigation indicator combining 360° radio directional bearings with an adjustable index laterally held angularly fixed in space.

Another object of the present invention is to provide a novel composite navigational indicator having an adjustable course index manually settable by means controlled exteriorly of the indicator.

Still another object of the present invention is to provide a novel composite navigational indicator having an adjustable course index orientated by an air-driven gyro-compass, and manually settable without opening the casing of the indicator.

These and further objects of the present invention will become more apparent in the following description of exemplifications thereof illustrated in the drawings, in which:

Fig. 1 is a diagrammatic arrangement of a preferred embodiment of the navigational system of the invention.

Fig. 2 is an elevational view, partly in section, of one form of the navigational indicator.

Fig. 3 is a plan view of a slightly modified form of the navigational indicator.

Fig. 4 is a diagrammatic blown-up illustration of the essential components of the navigational indicator of the invention.

Fig. 5 is an enlarged sectional view through the arrangement for manually setting the course index of the indicator.

Fig. 6 shows a modified arrangement for setting the course index of the indicator.

Fig. 7 is a cross-sectional view through the directional disk contining the desired course index.

Fig. 8 illustrates a modified arrangement for the navigational indicator system.

Figs. 9 to 14 illustrate some indications occurring in practice on the navigational indicator.

Figs. 15, 16 and 17 are diagrammatic representations of typical navigational maneuvers as executed by an aircraft using the system of the present invention, and corresponding indications on the indicator.

A preferred arrangement which the system of my present invention may assume in practice is diagrammatically illustrated in Fig. 1. The radio direction finder section of the system gives automatic indications over 360 degrees, and may well be the one disclosed in my copending application, Serial No. 286,733, filed July 27, 1939, now Patent No. 2,308,521, issued January 19, 1943, entitled "Automatic radio direction indicator." Equivalent automatic direction finders, capable of operating a bearing indicator over a 360° scale and give a bearing on a tuned-in radio station, may instead be used. The illustrated direction finder comprises a radio receiver and control circuit unit indicated at 1, to which is connected non-directional antenna 2 and rotatable directional or loop antenna 3 through leads 3'. A streamline housing about loop antenna 3, indicated in dotted lines at 4, is used to reduce the aerodynamic drag of the loop antenna when mounted exterior of the aircraft. Earphones 5 are connected to direction finder unit 1 for continuous aural reception, useful for identifying the radio station tuned-in and for obtaining weather reports or landing instructions.

A reversible motor 6 is connected to the control circuit portion of direction finder unit 1 through leads 6', and is energized in accordance with the received radio signals to rotate in either direction in accordance with the sense of the radio signal as determined by the loop antenna 3 when off-null position with respect to the incoming radio signal waves. The circuits and theory of this operation is described in Patent No. 2,308,521. Motor 6 is coupled to drive loop antenna 3 through electromagnetic clutch 7 electrically connected in parallel with motor 6; reduction gearing 8; worm gearing 9; and quadrantal corrector unit 10 interposed between shafts s' and s for loop antenna 3.

Quadrantal corrector unit 10 is an important component of the system. It is used for compensating for non-symmetrical metallic surroundings about the loop antenna, which otherwise would cause false bearing indications. A suitable quadrantal corrector for the unit indicated at 10 is disclosed in my Patent No. 2,296,285 and my copending application Serial Number 344,854, filed on July 11, 1940, entitled "Quadrantal compensators." An azimuthal or bearing indicator for the direction finder is indicated at 11 mechanically coupled to the gear systems 8 and 9 of the loop antenna drive through flexible cable 12. Indicator needle 13 of indicator 11 points out the angular position of the tuned-in radio station. This position directly corresponds to the angular position which loop antenna 3 assumes under the action of motor 6, and as compensated by corrector unit 10.

The composite navigational indicator is shown at 15. It is mechanically coupled to loop antenna 3 through flexible mechanical cable 14 directly connected to gearing 8 and indicator 11. The indicator 15 is shown in perspective in Fig. 1; in elevation and partly in section, in enlarged Fig. 2; in slightly modified plan view, in Fig. 3; and as a diagrammatic blown-up view, in Fig. 4. Indicator 15 is mounted in the cockpit adjacent the pilot with its scales preferably arranged horizontally. Navigational indicator 15 embodies a directional gyroscope or gyro-compass arranged to maintain directional scale 16 in predetermined orientations. Directional scale 16 is graduated in 360 degrees, and represents the land reference scale of the composite indicator.

A caging knob 17 is coupled to the internal gyro-compass mechanism for periodically resetting directional scale 16 to correspond with the magnetic compass readings. The reading of gyro-scale 16 as referred to the zero index of indicator 15 is made identical with the reading, in degrees, of the magnetic compass in the aircraft. True course bearings, with respect to North as ascertained from a map, are correlated with the magnetic compass readings and therefore with the gyro-scale 16 readings by taking into account magnetic variations, easterly or westerly, and magnetic deviations of the magnetic compass, as will be set forth hereinafter. A "desired course" index 18 is marked upon disk 26 which is adjustably mounted with respect to gyro-scale 16. Disk 26 is reset by push-button 19 operated in conjunction with caging knob 17 in a manner to be described. A "radio course" index 20, 21' is marked on transparent gear 28 mounted above directional scale 16 and "desired course" index 18. Radio index 20, 20' is directly controlled by flexible cable 14; and is moved in exact correspondence with needle 13 of azimuthal indicator 11, and with loop antenna 3 operated through quadrantal corrector 10.

The gyro-compass mechanism is contained within cylindrical housing 21. It is preferably an air-driven type. A tube 22 projects from housing 21 for connection to a vacuum source to drive the gyroscope mechanism, not shown but well known in the art. An air filter 23 is used to purify the drawn-in air. The 360° gyro-scale 16 is preferably etched directly on horizontal turn-table 24. Turn-table 24 is connected to vertical shaft 25 extending from the gyro-compass mechanism. Gyro-compass units per se are well known in the art, and may take optional forms. Details thereof accordingly not shown in the drawings. The directional gyroscope is arranged to maintain the orientation of turn-table 24 fixed in a set-up direction, regardless of changes of attitude of the aircraft or of casing 21.

Shaft 26 of turn-table 24 may for example be connected to the vertical ring of the gyro-compass, not shown in the drawings, but indicated as within casing 21. The horizontal turn-table 24 driven by the gyro-compass unit, and the associated caging arrangement 17 corresponds to the airport orientator instrument manufactured by the Sperry Gyroscope Company, Inc. of New York and described and illustrated in their publication entitled "Airport Orientator," dated October, 1938. The caging mechanism for controlling the relative setting of turn-table 24 with respect to the zero index of indicator 15, is operated by caging knob 17 directly geared to the contained gyro-compass mechanism. Suitable caging mechanisms are, for example, shown in the gyro-compasses disclosed in U. S. Patent No. 2,052,866 to Carlson et al. on September 1, 1936, for "Pilot directing gyroscope," and No. 2,061,894 to Carlson on November 26, 1936 for "Constrained directional gyroscope." The term "caging" is used in its usual technical sense and refers to the action effected by the caging mechanism referred to through caging knob 17 to mechanically reset the gyro-compass so that its indications are manually adjustable. In operation, the caging mechanism holds the directional gyroscope upright while the card is mechanically reset. When the caging knob 17 is pulled out in the directional gyroscope embodiment disclosed, the caging mechanism inside is released leaving the gyroscope horizontal and free.

Disk 26 is marked with "desired course" index 18. Disk 26 is adjustably mounted centrally of turn-table 24 with a suitable clip or eyelet 26'. The periphery of disk 26 contains teeth $t$ for engagement with toothed bar 27. A desirable pitch for teeth $t$ is 32 per inch, but a different pitch may be used. Bar 27 is directly connected to push-button 19 at the exterior of casing 21, and is normally mechanically biased out of engagement with the teeth of disk 26 by spring 19'.

The "radio course" index 20, 20' is inscribed on the transparent gear 28 meshing with worm 29 coupled to mechanical shaft 14. The radio course index preferably comprises a luminous head 20 and a luminous tail 20' as indicated, surfaced with a radium compound. The portions 20, 20' of the "radio course" index are interconnected by two parallel lines 30, 30 spaced sufficiently to enclose "desired course" index bar 18 when superimposed thereover, to afford the pilot a direct indication of such coincidence without incurring parallax. Parallel lines 30, 30 may be inscribed on gear 28 but are preferably wires suitably set into the gear. Transparent cover 31 of navigational instrument 15 contains the aircraft reference index or "lubber line" 32, fixedly pointing to the zero index of scale 33. A picture 34 of an aircraft is aligned with "lubber line" 32 to give a direct pictorial representation of the aircraft reference index for ready interpretation of the composite indications of the instrument. Scale 33 is calibrated in degrees, equally from either side of 0° to assist the pilot in setting "desired course" index 18, in a manner to be described.

Transparent cover 31 of the instrument is sealed into the rigid metallic lid 35 to prevent air leakage around its edges. A rubber gasket 36 is mounted at the top inside surface of housing 21. Lid 35 is clamped against gasket 36 by bolts or machine screws 37 through projecting lugs 38, to seal the instrument from the outside atmosphere. Transparent "radio course" gear 28 is mounted within lid 35 and arranged for free rotation. Gear 28 contains a central hole or opening 39. Opening 39 prevents frictional interference or freezing of the rotation of gear 28 due to the vacuum exerted on the gyro-compass unit within the instrument.

A preferred material for the "radio course" gear 28 containing index 20, 20' is the transparent plastic commercially known as "Lucite." The gear teeth 28' of gear 28 may be molded into its periphery or, preferably, directly cut thereon on a lathe. The opening 39 of gear 28 permits the proper mounting thereof on a mandril of a lathe, for cutting the teeth 28' therein. Worm 29 is rotatably mounted in extension 40 of lid 35, and meshes with floatingly mounted worm gear 28. The respective components of the indicator 15 are designed and constructed to prevent air leakage into the instrument except through the filter provided at 23.

Fig. 5 is a cross-sectional view through the mechanism for manually locking the position of course disk 26 for use in adjusting "desired course" index 18 with respect to gyro-scale 16. Bar 27 is slidably mounted in housing 21 of the instrument and is spring biased outwardly, away from teeth $t$ of disk 26 by spring 19'. A packing gland 41 surrounds rod 42 integral with bar 27, sealed off by packing nut 43 to prevent air leakage thru the mechanism. When push-button 19 is pressed against spring 19', the pointed tip of bar 27 engages a tooth of toothed disk 26, to hold disk 26 fixed against rotation. "Desired course" index 18 is then adjusted to point opposite the required angle on gyro-scale 16 by manually rotating turn-table 24. In the illustrated embodiment, turn-table 24 is rotated through caging knob 17. The "desired course" angle is calculated to account for magnetic variations of the vicinity and magnetic deviation of the compass. When "desired course" index 18 is properly adjusted with respect to scale 16, caging knob 17 is moved to its normal operating position and push-button 19 is released to disengage bar 27 from disk 26. The disk 26 arresting, and index 18 adjusting, means is an important feature of the present invention. It permits the ready adjustment of the "desired course" index 18 by the pilot during flight without opening up the navigational instrument.

Fig. 6 illustrates a modified arrangement for the course disk 26 locking mechanism, operated electromagnetically rather than mechanically, eliminating the requirement of a packing gland. Pointed bar 27 is arranged to engage a tooth of toothed disk 26, as in Fig. 5. A plunger 42' joins with an extension of bar 27, and is surrounded by solenoid 45. Spring-biased push-button 46 contains a metallic face arranged to electrically close the circuit between contacts 48, 48 and complete the circuit to an energizing source, not shown, connected to leads 49. When button 46 is pressed inwardly to close contacts 48, 48, solenoid 45 is energized and moves plunger 42' to the right against its biasing spring 50, causing the tip of bar 27 to engage a tooth $t$ of disk 26 and hold the disk against rotation for the setting of "desired course" index 18. The components of the electromagnetic disk locking means are sealed into housing 21 to prevent air seepage into the instrument.

The "desired course" index 18 has preferably a luminous bar arranged on a metallic disk 26 in the manner shown, composed of a phosphorescent or luminous material, such as a radium compound used in instrument marking. Fig. 7 is a cross-section through a preferred construction for the "desired course" disk 26 illustrating an undercutting or groove 55 therein. Groove 55 is filled-in with the luminous compound to form the "desired course" index 18. To avoid unbalancing of the turn-table 24 and effect undesirable precession in the operation of the gyroscope, a similar mass of luminous material is arranged symmetrically opposite index 18 on the reverse side. A corresponding groove 55' is cut in the under surface of disk 26, of the same size and shape as groove 55 and is filled-in with the luminous compound to form compensating index 18'. Absorption of moisture by the luminous compound during humid weather is thus compensated for weight increase at diametrically opposite sides of the center of rotation of turn-table 24. Precession effects are thus balanced out.

Changes in the specific forms of the illustrated exemplifications of the invention may be made without departing from the broader spirit and scope thereof. The "radio course" gear and associated index 20, 20' may, for example, be mounted exterior of the navigational unit. Different forms of the arresting means for "desired course" disk 26 may be employed. Different automatic radio directional receivers may be used to drive the 360° "radio course" index 20. Other means for spatially orienting the course disk 24 and the "desired course" index 18 may be incorporated in the system besides the directional gyroscope. In place of the directional gyroscope or gyro-compass disclosed for operating turn-table 24, a magnetic compass may be used with the operating member of the magnetic compass indicator being coupled to turn-table 24 or its equivalent. Such magnetic compass drive arrangement is disclosed in my copending application, Serial No. 335,229 filed on May 15, 1940.

The gyro-compass or magnetic compass unit may be separated from the composite indicator arrangement with telemetering or repeater means. Fig. 8 illustrates such modification of the invention, useful in certain commercial applications. The composite indicator is shown at 60, containing the scales and relative components as illustrated in Figs. 3 and 4, includes "desired course" index 18 on adjustable disk 26; "radio course" index 20, 20', (on transparent gear 28); 360° directional scale 16, (on turn-table 24); and "lubber line" 32 together with airplane picture 34, (on transparent cover 31). The "radio course" index 20, 20' is mounted on the transparent gear 28 which meshes with a worm rotatably supported in extension 40 of the casing of composite indicator 60 in turn directly coupled to flexible cable 14 which leads directly to and is controlled by an automatic direction finder such as shown in Fig. 1. Push-button 19 and bar 27 are similar to those shown in the previous modifications, as a means for manually setting the "desired course" index 18 without opening up indicator 60.

The course disk orientation mean, specifically a directional gyroscope, is contained at 61 for remotely controlling the orientation of horizontal scale 16 and its associated "desired course" index 18. A magnetic compass may be used in place of the gyro-compass. Compass unit 61 contains the usual gyro-compass (or magnetic compass) scale 62, and in the illustrated case contains an inclinometer 63. A caging knob 64 is used to control the position of directional scale 62, and as will be shown, the corresponding position of scale 16 and "desired course" index 18.

A telemetering arrangement synchronizes the movements of scale 62 with that of scale 16 of composite indicator 60. The transmitter of the telemetering system is indicated at 65 on top of compass unit 61. A preferred telemetering system is the Selsyn direct current type, energized by battery 66. Movement in transmitter 65 is mechanically effected by the motivating means for scale 62 corresponding, for example, to vertical shaft 25 of Fig. 2. The translator for the Selsyn system is incorporated within the housing of composite indicator 60, and is electrically interconnected with Selsyn transmitter 65 by three-wire cable 67. The direct current Selsyn telemetering system used is similar to the one disclosed in Figs. 1 and 10 of my Patent No. 2,308,521. Other telemetering means between directional scales 16 and 62 may be used. "Desired course" index 18 may be reset with respect to scale 16 of indicator 60 by pressing button 19 to cause bar 27 to engage a tooth on disk 26, and operating caging knob 64 to turn scale 16 by remote control.

*Aircraft navigation with the composite indicator*

The composite navigational indicator of the present invention automatically and accurately informs the pilot by pictorial indications how bets to navigate the aircraft under all conditions of flight. Problems in aircraft navigation are directly resolved, relieving the pilot of mental strain, calculations and uncertainty. The indications are quickly and easily interpreted, reducing the most advanced navigational problems to simple terms. With the system, a pilot can readily fly "blind" along any desired radio course, heading towards or away from any radio station in any desired radial direction, and traveling a predetermined straight track over the ground regardless of wind force or direction. The angle of drift or crab of the aircraft due to cross-winds is directly ascertained by the indications, and automatically corrected for in flight. The composite instrument of the invention serves as the usual directional gyroscope or gyro-compass in the aircraft, thus eliminating the installation of a separate one. The automatic uni-directional 360° radio course indicator incorporated in the system may be used independently as such for homing, and radio directional flight in general. A distinct indication is obtained when the aircraft passes over the radio station by a 180° reversal of the "radio course" index 20, 20'. The system is also most advantageously used for effecting a low approach and blind landing on a selected runway.

Only a single ground radio transmitter station is necessary for navigation with the instrument of the invention. The largest airliner, bomber or clipper may be navigated on a straight-track to any out-of-the-way airport having a simple radio transmitter and safely "blind-landed" on the local airport or seaport. The pilot simply tunes-in the radio station, ascertains the selected course or runway in degrees, sets his "desired course" index 18 accordingly, and is then prepared to effect a direct instrument approach and blind descent to the runway. The navigation and landing maneuvers are rendered foolproof and safe regardless of wind velocity or other weather conditions.

The basic principal of the indications of the system of the invention is readily comprehended by the pilot. It consists in correlating:

(1) A course index 18 held angularly fixed in spaced parallel to the desired course; with (2) A continuous bearing 20 on a radio station on the course; together with (3) A reference index 32 of the aircraft itself.

Each indication may be used independently of the other. However, when correlated, they directly and automatically resolve navigation problems for the pilot.

Straight track navigation towards a radio station is effected, automatically compensated for drift due to cross-winds, by maintaining "radio course" index 20 coincident with "desired course" index 18. The angle which coincident indices 18 and 20 makes with "lubber line" 32 is the drift angle of the aircraft, indicating the attitude of the aircraft with respect to the course of flight. The pilot, in a similar manner, can fly a predetermined straight track in any radial direction away from a radio station by keeping tail 20' of the "radio course" indicator coincident with "desired course" index 18.

The three indices tell the pilot the whole story in the simplest pictorial terms. Interpretation of the readings is practically intuitive. All navigational maneuvers are performed by the pilot with a minimum of calculation or interpretation. Only a single ground radio transmitter is necessary to complete the whole system, which station may be a commercial broadcast station, simple voice transmitter, Coast Guard station, radio range, etc.

The setting in degrees of "desired course" index 18 with respect to scale 16 depends on several navigational factors. The "desired course" is identical in degrees with the "magnetic compass course" for the destination, in degrees. The primary factor entering into the determination of the "magnetic compass course" and the "desired course" is the bearing in degrees of the course or destination of flight with respect to true North. Such true bearing is generally termed the "true course." The easterly or westerly magnetic variation, in degrees, for the vicinity, is respectively subtracted from or added to the "true course" to derive the "magnetic course." In a similar manner, deviation in degrees of the actual magnetic compass readings from true magnetic readings is used to correct the "magnetic course" to arrive at the desired "magnetic compass course" or generally termed "compass course."

The "compass course" is the degrees as read on the magnetic compass for straight alignment to a destination from a given position. The significance and mode of the "compass course" determination is well known to those versed in the art of navigation, and is clearly explained in Chapter III of the publication "Practical Air Navigation" by Thorburn C. Lyon of the U. S. Department of Commerce, published in 1939 by the U. S. Government Printing Office, Washington. The "desired course" index 18 is adjusted to read the "compass course" for the destination, in degrees on directional scale 16 by arresting movement of disk 26 through the pressing of push-button 19 and rotating directional scale 18 through caging knob 17, in the manner already described. After "desired course" index 18 is set, the reading of directional scale 16 with respect to the zero index of "lubber line" 32 is made to correspond identically with the reading on the magnetic compass of the aircraft. The caging knob 17 is then replaced to its normal operating position and the composite indicator 15 of the invention is in adjustment for the navigational guidance.

Figs. 9 through 14 illustrate typical indications by the composite indicator of the invention during flight conditions. Fig. 9 represents "homing" flight direct to a radio transmitter. The directional radio receiver 1 is tuned to the desired radio station, and "radio course" index head 20 is maintained coincident with "lubber line" 32, as shown. Its use in this case, is similar to the regular direction finder. The setting of the "desired course" index 18 is 40°.

When the aircraft passes over and beyond the radio station it is tuned to, the "radio course" index 20, 20' reverses its indication by 180°, serving as a marker indication of the site of the radio station. Fig. 10 illustrates the reversed position of the "radio course" index, the tail 20' thereof being aligned with the head of the "lubber line" 32. Fig. 11 corresponds to "homing" flight towards the radio station, similar to Fig. 9, with the "desired course" index 18 at the right of the two aligned indices. Such representation may well correspond to a cross-wind opposite to that for Fig. 9, or to a substantially different distance of the aircraft from the station, or a changed attitude of approach thereto on "homing."

An important feature of the present invention resides in the feasibility of straight-track navigation towards or away from a desired radio station in any radial direction. The straight-track navigation is effected by keeping the "radio course" index 20, 20' aligned with "desired course" index 18, and disregarding their position of alignment relative to the "lubber line" 32. In Fig. 12, the alignment of "radio course" head 20 with the "desired course" index 18, signifies that straight-track navigation is being executed directly towards the radio station on the ground. The radio station has a course bearing corresponding to the setting of the "desired course" index 18 on the gyro-scale 16, being 40° in the present case. This 40° setting as the "desired course," corresponds to the desired magnetic compass course as described. It is the true course bearing (with respect to true north) as obtained on a map, corrected for magnetic deviation (westerly or easterly) and for magnetic deviation of the magnetic compass itself, as is understood by those skilled in the art of navigation. The angle between the lubber line 32 and the two aligned indices 18, 20 is the attitude of the aircraft in flight along the desired straight track path.

In Fig. 12 the attitude of the aircraft is about 20° to the left of its course, compensating for cross-wind from the left. By maneuvering his aircraft to align the "radio course" and "desired course" indices 18 and 20, the pilot automatically assumes the proper drift angle or attitude of the aircraft, the magnitude and sense of this angle being pictorially indicated on the instrument for the pilot. The flight path in Fig. 12 is at the desired radial direction with respect to the radio station, and towards the station. As the pilot continues to his destination, the "radio course" and "desired course" indices 18 and 20 remain aligned for a straight-track course to the station, straight with respect to ground. The attitude of the aircraft changes in accordance with the changing velocity of cross-winds, evidenced by the divergence of the lubber line 32 from the aligned indices.

When the pilot passes over the radio station on the straight-track path, the "radio course" index 20, 20' reverses by 180° so that the head 20 thereof continues to point to the radio station. In this position, the tail 20' of the "radio course" index is aligned with the "desired course" 18 as shown in Fig. 13. The angle of drift remains the same, since it represents a continuation of the same attitude of the aircraft with respect to the straight-track path. Fig. 14 shows the indications occurring when straight-track navigation is directly towards the radio station, with the cross-winds coming from the direction opposite to that in Figs. 12 and 13, namely from the right. The aircraft is crabbed into the wind, to compensate for the cross-velocity, resulting in straight-track flight.

The navigational indicator of the present invention is useful for all navigational maneuvers and problems which may be encountered in private, commercial, military, or naval operations. Its operation requires a simple radio transmitter ground station, enabling the use of any type of radio transmitter encountered in the course of navigation. This factor adds to the reliability of the navigational guidance with the system of the invention along any terrain which may be encountered in practice. It also reduces to an absolute minimum the cost and complexity of ground radio facilities required for radio guidance or blind landing on an airport. The same ground station can be used for communication with the pilot for station identification, weather reports or flying and landing instructions. In order to set forth the great practical usefulness and flexibility of the system of the present invention under service conditions, typical maneuvers and uses thereof are described in the following:

A. *Automatic radio direction finder.*—When used as an automatic radio direction indicator, "radio course" index 20 is correlated with the "lubber line" 32. The radio course bearings are true azimuthal readings in degrees, quadrantally compensated over the 360° scale. The readings are not ambiguous, being uni-directional, and accurate within 1° of arc. The pilot simply tunes-in the desired radio station and "radio course" indicator 20 on unit 15 continuously points out the direct bearing on the station. Azimuth indicator 11 may optionally be referred to, since "radio course" index 20, 20' of composite indicator 15 is geared in a manner to move in exact correspondence with needle 13 of azimuthal indicator 11, to give the same radio bearings, as previously described. A preferred direction finder circuit is that disclosed in my Patent No. 2,308,521 referred to, using a wide range of radio frequencies for reception. Radio bearings may be obtained with the system on any type of radio transmitter. It is impossible to cause bearing errors or reversal of indication due to mistuning. Night effect, static and interference due to mountains are nullified due to ready visual integration of the automatic bearings. "Homing" flight to a radio station is effected by keeping "radio course" indicator 20 coincident with "lubber line" 32, or keeping indicator 13 on the zero index of azimuth indicator 11. When the aircraft passes over the tuned-in radio station, a 180° reversal of the "radio course" indicators marks the exact spot of the radio transmitter.

B. *Gyro-compass.*—The gyro-compass scale 16 serves as the usual directional gyroscope when referred to "lubber line" 32. It should be checked every 15 or 20 minutes against the reading of the magnetic compass, using caging knob 17 in the usual manner. No additional gyro-compass is necessary on the aircraft, thus saving the space, weight and cost of such unit. The "desired course" index 18 is a valuable addition to the gyro-compass, since necessity for interpreting and calculating the usual gyro-compass readings is avoided. The pilot knows immediately the significance of the positions of the gyro-scale and "desired course" index 18 with respect to "lubber line" 32, directly giving the direction and degrees of right and left deviation of attitude of the aircraft with respect to the desired course. The perception is direct and pictorial. Index 18 is set at the desired magnetic compass course as previously described, and affords the pilot a direct interpretation of the attitude of the aircraft with respect to his chosen course. The feature of the adjustable "desired course" index 18 with respect to the directional scale 16 referring to the zero index of the indicator may be used in applications independently of the addition of the "radio course" index 20, 20'. The directional scale 16 may be spatially oriented through either the gyro-compass illustrated or a magnetic compass, or through a telemetering arrangement connected thereto.

C. *Automatic orientation.*—By directly viewing the "desired course," "radio course," and "lubber line" indices, the pilot automatically obtains a direct pictorial representation of the aircraft orientation and the navigational maneuvers. The "desired course" index 18 is adjusted and maintained spatially paralled to the angular course of the destination. The luminous arrow head 20 of the "radio course" represents the tower of the radio transmitter at the destination. When the radio tower index 20 is directly opposite the "desired course" index 18, the pilot knows that he is flying in a straight track over ground to the tuned-in radio station. Conversely, when the luminous tail 20' of the "radio course" indicator is aligned with the "desired course" index 18, the pilot knows that he is flying in the predetermined radial direction, but directly away from the radio station. An angular divergence between "radio course" indicator 20 and "desired course" indicator 18 directly informs the pilot of his relative lateral orientation, so that he may directly maneuver the aircraft in a desired direction. The "lubber line" 32 together with the aircraft picture 34, when viewed with the other indications 18 and 20, gives the attitude of the aircraft with respect to both the "desired course" as well as with respect to the "radio course." The angle of drift due to crosswinds is also directly ascertained from these readings.

D. *Automatic drift compensation.*—The pilot may fly in a straight path towards or from a radio station, in any desired angular relation, by keeping the "desired course" index 18 aligned with the "radio course" 20 and disregarding "lubber line" 32. The angle between the "lubber line" 32 and the aligned indices 18 and 20, is the angle of drift due to wind forces on the aircraft flying in a desired path to the radio station. The attitude which the aircraft must assume to directly fly the desired angular course with aligned indices 18 and 20, automatically results in drift compensation. The drift angles are in turn directly indicated on the composite indicator.

E. *Straight track navigation.*—With the indicator of the invention, the pilot can fly by "dead reckoning," making good a predetermined track over the ground regardless of wind force or direction, on any computed radial heading towards or away from a radio station. The radio station on the desired course is first tuned-in on the automatic direction finder unit 1 to control "radio course" index 20—20'. The "desired course" index 18 is then adjusted by means of caging knob 17 and push-button 19 to point to the corrected desired angular course on gyro-scale 16. For straight track flight towards the radio station, the pilot maintains luminous "radio course" head 20 aligned with luminous "desired course" bar 18 as described in connection with Figs. 12 to 14. Cross-winds tend to move these indices apart. By maneuvering the aircraft to keep indices 18 and 20 aligned, the pilot automatically corrects for the winds and keeps the straight course with respect to ground. When the aircraft passes over the station, luminous head 20 reverses by 180°, the luminous tail 20' of the "radio course" indicator moving opposite luminous bar 18 as shown in Fig. 13. Straight track flight may be effected in a direction away from the radio station, by maintaining indices 18 and 20' in alignment. The straight-track navigation is equivalent to radio range flight. However, with the system of the invention no ambiguity whatever is possible, any available type of radio station may be used for straight tracking, and any desired radial direction for the straight track may be chosen with respect to the station.

F. *Itinerant pilot navigation.*—With the navigational indicator described, the itinerant pilot may safely fly cross-country on any desired itinerary. He may chart a zig-zag course, referring to any type of radio station en route. Homing or straight track navigation towards or from the radio stations is available. He receives a direct indication whenever he passes over a chosen radio station in his path. The wide radio frequency range provided increases the usefulness of the system for out-of-the-way locations. Cross-country flight for even the novice is greatly simplified, since his navigation problems are solved by the pictorial indications provided. Also, low approach and "blind" landing with the system is rendered a simple maneuver, readily mastered by the veteran pilot and novice alike.

G. *Radio range navigation.*—Navigation on the A—N type beacons, known as radio ranges, is a direct, certain and simple matter with the composite indicator of the invention. No uncertain aural compromises are necessary. It is practically impossible to get lost with respect to the ranges. Should the pilot lose a leg of the beam, the indicator immediately informs him just how far off he is, and which way to head to get back on it. It also informs him when he passes over the cone of silence of the beacon transmitter onto another leg of the beam, making a special Z-type marker beacon for the cone of silence unnecessary. The dangers attendant the neglect of drift or night effect in range flying are eliminated. Where a "squeezed beam" is flown against a substantial cross-wind, uncertainties of position or as to which leg of the beam is being flown are entirely resolved. The pilot may listen to the A—N signals through the ear-phones 5 if he so desires. The indications, with "radio course" index 20 continuously pointing to the beacon tower, and with the "desired course" index 18 continuously indicating the angular direction of the leg of the beam being flown, removes all doubt and uncertainty from beam flying under any condition.

H. *Airline navigation.*—With the composite navigational indicator, courses may be charted for airliners along any desired region, without requiring special radio ground equipment, station markers or landing glide paths. Advantage may be taken of any type of radio station along the course. The system may be used to either "home" or straight track to the stations, or to fly radio ranges. Marker indications upon passage over any radio station tuned-to is afforded. Automatic compensation for drift due to cross-winds is available. Mental ease and confidence, and a minimum of calculation for the pilot adds greatly to the desired safety for airline operations. Adverse weather conditions, static, night effect or mountainous terrain do not affect the accuracy or performance of the system in navigation. The advantages of simplified and foolproof navigation are equally available to ocean clippers and land lines. Should unexpected divergence from a chosen course be indicated, the pilot may safely navigate to any out-of-the-way locality having any simple radio transmitter, and readily effect a blind landing on its local airport. Also, lateral separation of aircraft enroute is made practical.

I. *Military maneuver.*—Practically every type of military maneuver and operation may be directly and effectively carried out, with complete assurance and a minimum of calculation by depending on the indicator of the invention. Flight to an enemy objective may be performed in bad weather by relying only on a single transmitter of known position. Homing, straight track flight, gyro-compass indication, station-position marking, low approach and blind landing are all available with the invention instrument, tuned to a single radio station. Problems in interception, search patrol, aerial survey are greatly simplified. With the navigational system of the invention, the military pilot may better concentrate on his usual other duties. A typical military aviation problem is illustrated in Fig. 15, as executed with the indicator of the invention. A bombing objective O is in enemy territory across a river. Its course from known friendly radio transmitter T is 75°. A cross-wind is blowing as indicated. The pilot flys to station T either by "homing" along path A or straight tracking on the known 115° course to the station along path A'. The drift angle of the plane is indicated by the "lubber line" indication. When the plane passes over station T, the "radio course" index reverses 180°. The pilot then adjusts the "desired course" index for the 75° objective course, turns about at B, and then flys directly towards objective O. The relative indications for this maneuver are shown at C. Drift compensation is effected for the straight track. The only calculation is for elapsed time to reach objective O, using the known distance from station T, and the air speed of the aircraft.

J. *Seaplane landing.*—The landing of a large seaplane, such as a clipper ship, or a military or naval aircraft, is greatly facilitated with composite indicator 15. Such landings are readily guided "blind," into-the-wind, and clear of all local obstructions. Fig. 6 diagrammatically illustrates the simple procedure involved in landing a seaplane. A voice transmitter T is carried by a boat in the bay for the landing. The direction of the wind is determined and communicated to the pilot of the seaplane. The boat is positioned so that the path of the plane into-the-wind also avoids all local obstructions, such as buildings O. The transmitter T may be carried by a motor truck which may ride to an appropriate position along the shore. The pilot adjusts the "desired course" index in accordance with the wind direction as ascertained from station T or on the plane itself. He then maneuvers his craft to a position behind the transmitter T corresponding to the position shown at A. He knows he is on-course by the alignment of the "radio course" and "desired course" indices, as shown in A. In view of the flight being into-the-wind, no drift or crab angle occurs, as the "lubber line" shows. The altitude of the aircraft above ground is then arranged in accordance with the desired low approach procedure for the landing of the particular craft. The pilot knows the instant he passes above transmitter T by the reversed indications of the "radio course" index. The pilot gradually descends, passing position B where the "radio course" index is 180° away from the "desired course" index, and alights on the bay at a position such as indicated at x.

K. *Low approach and blind landing.*—The system of the invention permits a direct approach to the vicinity of an airport and the confident maneuvering of the aircraft to a head-on position to a selected runway and descent thereon. The system is admirably suited for such maneuvering. Fig. 7 diagrammatically represents a recommended low approach and blind landing maneuver. The pilot tunes-in to the radio transmitter station at the airport, such as transmitter T indicated. He communicates with the airport to find out which runway they recommend using for landing at that time, in view of traffic or weather conditions. The selected runway R of Fig. 7 is an 89° course. The pilot then adjusts the "desired course" index of the invention unit to correspond to the course of the runway, 89° in the present case. Naturally, compensation for a magnetic variation and deviation is made for the "desired course" setting. The transmitter T may be mounted on a motor truck as indicated and is moved in line with the selected runway R spaced at a predetermined distance from the head of the runway, such as 500 feet.

From his original high altitude, such as 3,000 to 10,000 feet at position A, the pilot flies towards the transmitter T by "homing" or by straight track flight as preferred. In homing the "lubber line" is merely kept coincident with the "radio course" indication. At position B, the pilot is pretty close to the position of transmitter T and has descended to 2,000 feet elevation. The pilot knows as soon as he passes over the station T by the reversal of the "radio course" indication. When he passes station T, he makes a turn as indicated at position C and moves his aircraft "on-course" with the runway as denoted by the alignment of the "radio course" index with the "desired course" index. The present case is illustrated without cross winds. The elevation of the aircraft is gradually reduced. At position D, it is at 1,500 feet, and on-course with runway R still flying away therefrom. The pilot continues to fly away from station T for about three minutes as reckoned from his position at C before attempting to reverse his flight and effect the blind landing. The fan marker beacon indicated in dotted may optionally be located about 10 miles from the runway to inform the pilot when to effect such turn.

At position E, the pilot is ready to execute a standard 180° turn, still reducing altitude. At position F, the elevation is about 1,000 feet and the aircraft is directed to the on-course 89° path to runway R. The aircraft is on-course again at position G and its elevation, in this case, is preferably about 800 feet above ground. Flight is continued to position H near the head of transmitter T, lowering the elevation until it is about 200 feet at that position, and at the same time lowering the speed of flight of the aircraft. The pilot knows when he passes over station T by the reversal of the "radio course" index. At this time, he is ready to effect a blind descent to the runway R. His descent rate should be about 300 to 400 feet per minute at aircraft speed of 75 to 85 miles per hour.

In view of the accurate "radio" and "desired course" indications of the system, the runway localizer action for blind landing is possible for even a relatively narrow runway. The effects of cross-winds are automatically compensated for by adjustment of the plane into a proper crabbing angle. Thus, in conjunction with a sensitive altimeter, the system of the invention effects automatic low approach and blind landing with a single transmitter T placed at the head of the runway as indicated. Two-way radio communication is constantly effected with station T, which may be voice modulated from a control tower of the airport or by an operator in a vehicle.

Having thus described the present invention in connection with preferred exemplifications thereof, it is to be understood that constructional modifications are feasible within the broader spirit and scope of the invention, and that the system of the invention may be used for different maneuvers and other purposes than those referred to, for example aboard marine craft. Accordingly it is not intended to be limited except as set forth in the following claims.

I claim:

1. A vehicle navigational instrument of the character described comprising a rotatable radio course index, directional compass means having coupled thereto a turn-table, a toothed disk with a desired course index, said disk being rotatable by and adjustably mounted on said turn-table and arranged coaxially with said radio course index, mechanism operable from the exterior of said instrument for selectively engaging said toothed disk to arrest the position thereof, and a device coupled to said directional compass means and operable from the exterior of said instrument for manually rotating said turn-table, whereby the relative setting of said desired course index with respect to said turn-table is manually controllable when said mechanism is engaged with said disk.

2. In a vehicle navigational instrument of the character described comprising a rotatable radio course index, gyro-compass means having coupled thereto a turn-table, and a disk rotatable by and adjustably mounted on said turn-table arranged coaxially with said radio course index and having a desired course index in the form of a luminous compound marked thereon, and a corresponding region diametrically opposite said desired course index symmetrically containing an equivalent form of luminous compound to compensate the action of said gyro-compass means against precessional errors due to moisture absorption by the luminous compound.

3. A navigational instrument of the character described comprising: a directional compass, a disk containing a desired course index, said disk being rotatable by and adjustably mounted on said directional compass, a member rotatably supported adjacent said disk, a radio course index carried by said member coaxially and simultaneously visible with said desired course index, a housing for said directional compass and indices, an element rotatably supported in said housing, said element being engaged with said member for rotation thereof and having a projecting portion for external mechanical coupling, mechanism mounted in said housing adjacent said disk and arranged for direct contacting engagement with said disk, and means for turning said compass while said mechanism is held in engagement with said disk for shifting the angular position of said desired course index with respect to said compass.

4. A navigational instrument of the character described comprising: a directional compass, a turn-table coupled thereto, said turn-table being spatially oriented by said directional compass, a disk containing a desired course index, said disk being rotatable by and adjustably arranged on said turn-table, a member rotatably supported adjacent said turn-table, a radio course index carried by said member coaxially and simultaneously visible with said desired course index, a housing for said directional compass and indices, an element rotatably supported in said housing, said element being coupled to said member for rotation thereof and having a projecting portion for external mechanical coupling, mechanism mounted in said housing adjacent said disk and arranged for direct contacting engagement with said disk, and means for turning said turn-table while said mechanism is held in engagment with said disk for shifting of the angular position of said desired course index on said turn-table.

5. A navigational instrument of the character described comprising: a directional compass embodying a turn-table which bears a three hundred and sixty degree scale, said turn-table being spatially oriented by said directional compass, a disk containing a desired course index coaxially arranged on said turn-table and adjustably mounted thereon, a gear member rotatably supported adjacent said disk, a radio course index carried by said member coaxially and simultaneously visible with said desired course index, a housing for said directional compass and indices, a gear element rotatably supported in said housing, said gear element meshing with said gear member and having a portion extending through the housing for external mechanical coupling thereto, mechanism mounted in said housing adjacent said disk and arranged for direct contacting engagement with said disk for selective manual shifting of the angular position of said desired course index on said turn-table, a window mounted on the housing over said indices, and a stationary reference course index arranged on said window in a radial direction parallel with the other indices when in alignment therewith.

6. A navigational instrument of the character described comprising: a directional compass, a disk containing a desired course index, said disk being rotatable by and adjustably mounted on said directional compass, a member rotatably supported adjacent said disk, a radio course index carried by said member coaxially and simultaneously visible with said desired course index, a housing for said directional compass and indices, an element rotatably supported in said housing, said element being engaged with said member for rotation thereof and having a projecting portion for external mechanical coupling, and mechanism for direct contacting engagement with said disk for selective manual shifting of the angular position of said desired course index with respect to said compass comprising a plunger mounted in said housing substantially in the plane of said disk and having a tip projecting thereto for direct engagement therewith, and a spring connecting to said plunger for normally holding said tip disengaged from said disk.

7. A navigational instrument of the character described comprising: an air-driven gyro-compass embodying a turn-table having a three hundred and sixty degree scale, said turn-table being spatially oriented by said gyro-compass, a disk containing a desired course index, said disk being rotatable by and concentrically arranged with said turn-table and adjustably mounted thereon, a gear member supported adjacent said disk, a radio course index carried by said member coaxially and simultaneously visible with said desired course index, a housing for said gyro-compass and indices, a gear element rotatably supported in said housing, said gear element meshing with said gear member and having a projecting portion extending through the housing for external mechanical coupling, and a window sealed in the housing above said indices, a stationary reference course index marked on said window, and mechanism for direct contacting engagement with said disk for selective manual shifting of the angular position thereof on said turn-table comprising a plunger mounted in said housing having a tip projecting towards the periphery of said disk, a part of said plunger extending exteriorly of said housing for manual actuation, and an air-tight packing slidably sealing said plunger in said housing.

8. A vehicle navigational instrument of the character described comprising a rotatable radio course index, directional compass means having coupled thereto a turn-table, a disk with a desired course index, said disk being rotatable by and adjustably mounted on said turn-table and arranged coaxially with said radio course index, mechanism operable from the exterior of said instrument for selectively engaging said disk to arrest the position thereof, and a device coupled to said directional compass means and operable from the exterior of said instrument for manually rotating said turn-table, whereby the relative setting of said desired course index with respect to said turn-table is manually controllable when said mechanism is engaged with said disk.

9. A vehicle navigational instrument of the character described comprising a rotatable radio course index, directional compass means, a turn-table, and telemetering mechanism coupling said directional compass means to said turn-table, a disk with a desired course index, said disk being rotatable by and adjustably mounted on said turn-table and arranged coaxially with said radio course index, mechanism operable from the exterior of said instrument for selectively engaging said disk to arrest the position thereof, and a device coupled to said directional compass means and operable from the exterior of said instrument for manually rotating said turn-table, whereby the relative setting of said desired course index with respect to said turn-table is manually controllable when said mechanism is engaged with said disk.

10. In a vehicle navigational instrument of the character described comprising a rotatable radio course index, gyro-compass means having coupled thereto a turn-table, and a disk rotatable by and adjustably mounted on said turn-table arranged coaxially with said radio course index and having a desired course index in the form of a luminous compound marked thereon, and a corresponding region diametrically opposite said desired course index symmetrically containing an equivalent form of luminous compound to compensate the action of said gyro-compass means against precessional errors due to moisture absorption by the luminous compound, mechanism operable from the exterior of said instrument for selectively engaging said disk to arrest the position thereof, and means for turning said compass while said mechanism is held in engagement with said disk for shifting the angular position of said disk with respect to said turn-table.

11. A vehicle navigational instrument of the character described comprising a rotatable radio course index, directional compass means having coupled thereto a turn-table, a disk with a desired course index, said disk being rotatable by and adjustably mounted on said turn-table and arranged coaxially with said radio course index, electrically operable mechanism controlled from the exterior of said instrument for selectively engaging said disk to arrest the position thereof, and a device coupled to said directional compass means and operable from the exterior of said instrument for manually rotating said turn-table, whereby the relative setting of said desired course index with respect to said turn-table is manually controllable when said mechanism is engaged with said disk.

12. A navigational instrument of the character described comprising: a directional compass, a disk containing a desired course index, said disk being rotatable by and adjustably mounted on said directional compass, a member rotatably supported adjacent said disk, a radio course index carried by said member coaxially and simultaneously visible with said desired course index, a housing for said directional compass and indices, an element rotatably supported in said housing, said element being engaged with said member for rotation thereof and having a projecting portion for external mechanical coupling, and mechanism for direct contacting engagement with said disk for selective manual shifting of the angular position of said desired course index with respect to said compass comprising a plunger substantially in the plane of said disk and having a tip projecting thereto for direct engagement therewith, a solenoid supported in said housing and coactable with said plunger, said solenoid being operable when energized to urge said plunger towards said disk, a spring operatively associated with said plunger for normally holding said tip disengaged from said disk, and means on the exterior of said housing for energizing said solenoid.

13. A navigational instrument of the character described comprising: an air-driven gyro-compass embodying a turn-table having a three hundred and sixty degree scale, said turn-table being spatially oriented by said gyro-compass, a disk containing a desired course index, said disk being rotatable by and concentrically arranged with said turn-table and adjustably mounted thereon, a gear member supported adjacent said disk, a radio course index carried by said member coaxially and simultaneously visible with said desired course index, a housing for said gyro-compass and indices, a gear element rotatably supported in said housing, said gear element meshing with said gear member and having a projecting portion extending through the housing for external mechanical coupling, and a window sealed in the housing above said indices, a stationary reference course index marked on said window, and mechanism for direct contacting engagement with said disk for selective manual shifting of the angular position thereof on said turn-table comprising a plunger mounted in said housing having a tip projecting towards the periphery of said disk, a solenoid connected to said plunger and operable when energized to urge said plunger toward said disk, a spring operatively associated with said plunger for normally holding said tip disengaged from said disk, and control means for energizing said solenoid sealed in said housing and operable from the exterior thereof.

WILLIAM P. LEAR.